United States Patent [19]

Takai

[11] Patent Number: 4,791,564
[45] Date of Patent: Dec. 13, 1988

[54] RANDOM ACCESS MEMORY FILE APPARATUS FOR PERSONAL COMPUTER WITH EXTERNAL MEMORY FILE

[75] Inventor: Yasuyuki Takai, Nara, Japan

[73] Assignee: Sharp Kabushiki Kaisha, Osaka, Japan

[21] Appl. No.: 161,387

[22] Filed: Feb. 22, 1988

Related U.S. Application Data

[63] Continuation of Ser. No. 728,887, Apr. 30, 1985, abandoned.

[30] Foreign Application Priority Data

May 7, 1984 [JP] Japan .................................. 59-91313

[51] Int. Cl.⁴ .......................................... G06F 13/00
[52] U.S. Cl. .................................................. 364/200
[58] Field of Search ....... 364/200 MS FILE, 900 MS FILE;
371/21; 358/256

[56] References Cited

U.S. PATENT DOCUMENTS

| 4,067,059 | 1/1978 | Derchak | 364/200 |
| 4,126,893 | 11/1978 | Cronshaw et al. | 364/200 |
| 4,241,420 | 12/1980 | Fish et al. | 364/900 |
| 4,348,761 | 9/1982 | Berger | 371/21 |
| 4,399,503 | 8/1983 | Hawley | 364/200 |
| 4,456,971 | 6/1984 | Fukuda et al. | 364/900 |
| 4,603,380 | 7/1986 | Easton et al. | 364/200 |
| 4,604,653 | 8/1986 | Shimizu | 358/256 |
| 4,716,522 | 12/1987 | Funabashi et al. | 364/200 |

Primary Examiner—Gary V. Harkcom
Assistant Examiner—Randy W. LaCasge
Attorney, Agent, or Firm—Birch, Stewart, Kolasch & Birch

[57] ABSTRACT

A memory file system suitable for a computer such as a personal computer comprises a central processing unit (CPU) for controlling the operation of the computer, an external memory such as a sequential access type floppy disc for storing data, a printer for printing out the data with the help of the CPU, and a random access memory (RAM) for storing code data to be forwarded into the the external memory. The RAM stores the data together with a directory.

4 Claims, 2 Drawing Sheets

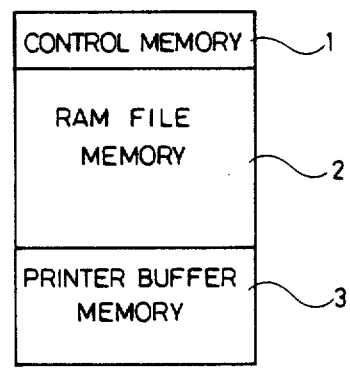
FIG. 2
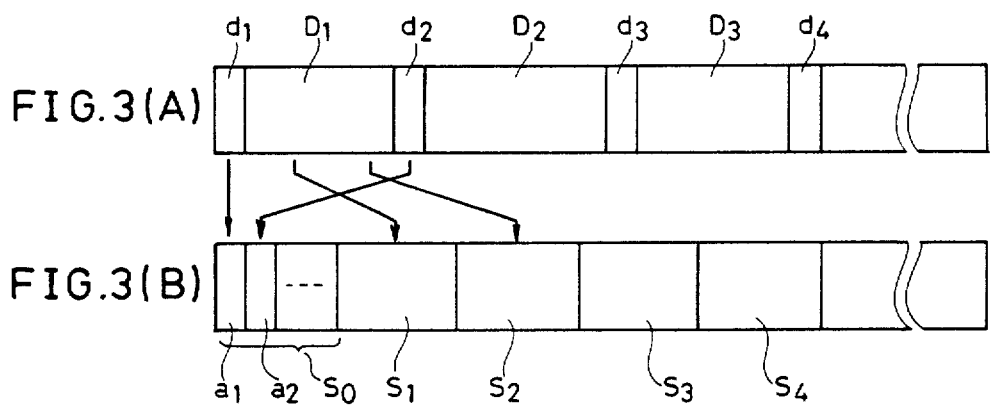
FIG. 3(A)
FIG. 3(B)
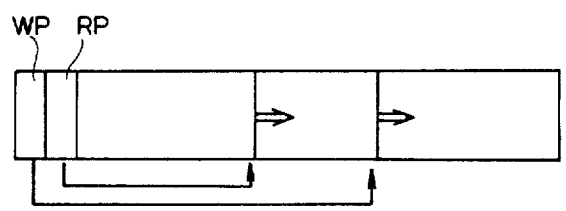
FIG. 4

RANDOM ACCESS MEMORY FILE APPARATUS FOR PERSONAL COMPUTER WITH EXTERNAL MEMORY FILE

This application is a continuation of application Ser. No. 728,887 filed on Apr. 30, 1985, now abandoned.

BACKGROUND OF THE INVENTION

The present invention relates to a memory file apparatus and, more particularly, to an improved file apparatus for a computer such as a personal computer.

Conventionally, there have been proposed many types of memories such as a tape recorder and a hard disc suitable for a computer including a personal computer. Now, it is desired that an improved memory be provided, being reasonable in price and being able to transfer data at a high speed with a random access function and a spool function for conducting tasks in parallel.

SUMMARY OF THE INVENTION

Accordingly, it is an object of the present invention to provide an improved memory suitable for a computer such as a personal computer, characterized in that the memory is reasonable in price and can transfer data at a high speed, with random acess capability.

It is another object of the present invention to provide an improved memory file apparatus for a computer, characterized in that a spool function for conducting tasks in parallel is provided to an output device such as a printer operatively connected to the computer.

Briefly described, in accordance with the present invention, a memory file apparatus for a computer such as a personal computer comprises central processing unit (CPU) means for controlling the operation of the computer, external memory means for storing data, output means for outputting the data with the help of the CPU means, and random access memory (RAM) means for storing code data to be forwarded into the external memory means, the RAM means storing the data together with a directory.

In a specific form of the present invention, the external memory means is a floppy disc of a sequential access type for storing files which are to be outputted in the form of a random access memory file containing an address map. The RAM means is operated to access the files.

BRIEF DESCRIPTION OF THE DRAWINGS

The present invention will become fully understood from the detailed description given hereinbelow and the accompanying drawings which are given by way of illustration only, and thus are not limitative of the present invention and wherein:

FIG. 2 shows the contents of a memory file according to the present invention;

FIGS. 3(A) and 3(B) show the structure of files of sequential access type floppy disc and part of the random access memory (RAM) according to the present invention, respectively; and FIG. 4 shows the structure of the file of a memory for a printer buffer inthe RAM.

DESCRIPTION OF THE PREFERRED EMBODIMENT

Figure 1:
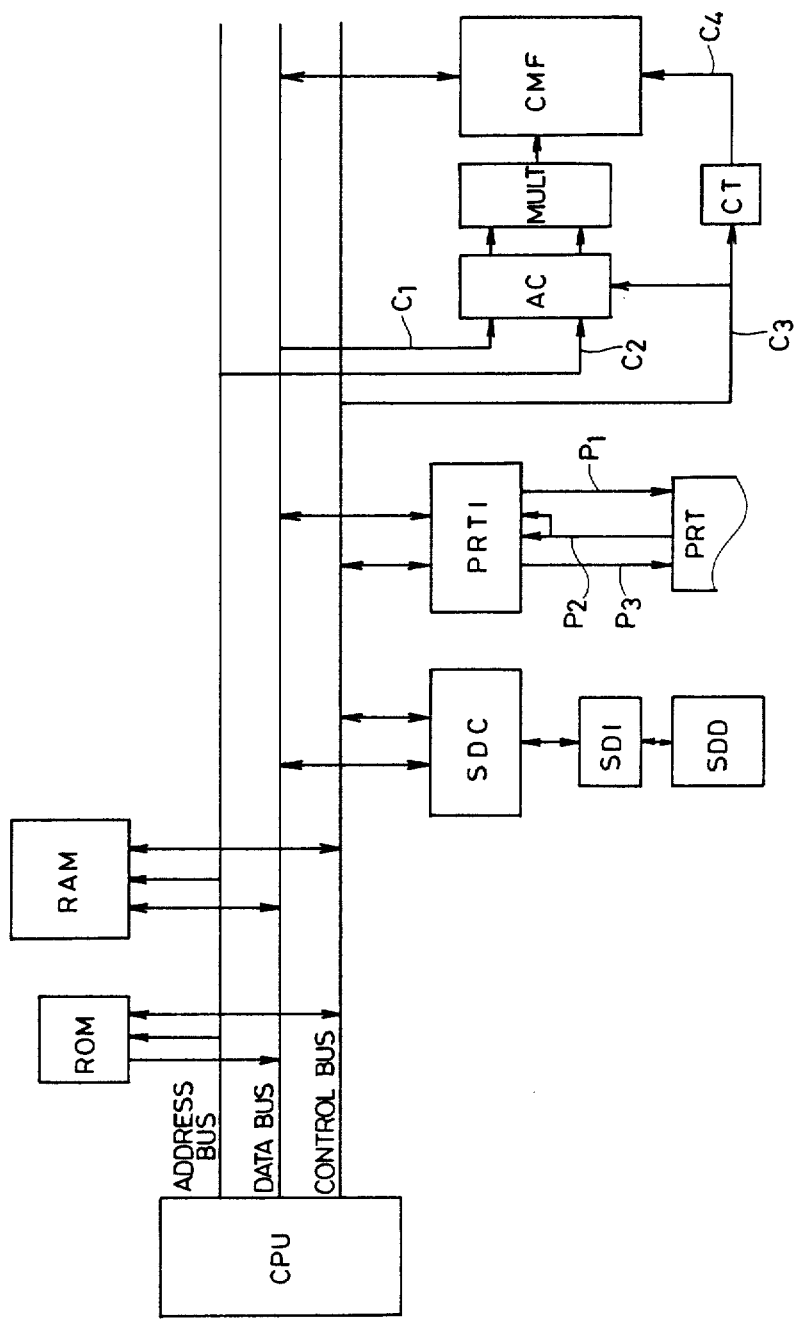
FIG. 1 is a block diagram of a personal computer according to the present invention.

FIG. 1 is a block diagram of a computer such as a personal computer according to the present invention.

The circuit of FIG. 1 comprises a central processing unit CPU, a read only memory ROM, a random access memory RAM, a sequential access type floppy disc drive system SDD, a sequential access type floppy disc interface SDI, a sequential access type floppy disc controller SDC, an output device such as a printer PRT, a printer interface PRTI, a memory file CMF, an address multiplexer MULTI, an address latch and counter AC, and a control circuit CT.

The central processing unit CPU is provided for controlling the operation of the computer. It is composed of a microprocessor avaiable, for example, from SHARP CORPORATION, in Japan under trade name of Z-80. The read only memory ROM is provided for storing a program for an initial program loader (IPL) and a system monitor. The random access memory RAM functioning as a read/write memory is a dynamic RAM for storing the program loaded from an external memory.

The sequential access type floppy disc drive system SDD is provided for storing the data for the personal computer. This type of floppy disc drive system is featured can store the data sequentially. More particularly, a header indicating the number of files is read in order to condition the apparatus for writing a new file on the storage medium at a position after the previously stored files. A file number area to which the figure of "0" should be stored upon its data format formation and usually a file number is stored therein. The data storage medium has a plurality of storage areas between a medium top and a medium end. After preparing the data storage format, each time a single file is stored in the medium, the contents of the file number area are increased by 1. When a new file is stored, the position of the file in the medium is determined according to the file number already stored in the file number area, so that a new file is stored just following the recently-stored file. Selecting a file number enables a new file to be stored just following the file selected by the file number. (In this case, all the files stored following the newly-stored file are erased.)

The sequential access type floppy disc controller SDC is provided for controlling the operation of SDD. The interface SDI is provided for interfacing between the sequential access type floppy disc drive system SDD and the central processing unit CPU.

The printer PRT is provided for printing out the data. The interface PRTI is provided for interfacing the printer PRT and the central processing unit CPU. The memory file CMF is a dynamic RAM for storing the data of the central processing unit CPU. The address multiplexer MULTI is provided for addressing the CMF. The address latch and counter AC is provided for latching the address and counting. The controller CT is provided for generating column address signals and load address signals.

To operate the sequential access type floppy disc drive system SDD as a random access file, although in this system SDD stores the data sequentially in principle, the memory file CMF is operatively interposed. The contents of the sequential access type floppy disc drive SDD are once read-out in locations of the memory file CMF. Because the memory file CMF is composed of a RAM, the random access function can be obtained. After the operation has been completed, all the data are stored in the sequential access type floppy disc drive system SDD through the memory file CMF, so that a random access feature can be conducted as the first feature of the present invention.

To operate the printer PRT, the code data to be forwarded into the printer PRT are temporarily stored in locations of the memory file CMF, so that a spool function for enabling the CPU to execute other tasks during operating the printer PRT can be obtained as the second feature of the present invention.

FIG. 2 shows the structure of the files of the memory file CMF of FIG. 1.

The files of the memory file CMF are composed of a control memory 1, a RAM file memory 2, and a printer buffer memory 3. The memory file CMF has a capacity of 64K bytes in total. The control memory 1 is a fixed memory with a capacity of 16K bytes. The remaining capacity is divided into the RAM file memory 2 and the printer buffer memory 3. The RAM file memory 2 is used to access the sequential access type floppy disc drive system SDD. The printer buffer memory 3 is used to store the code data to be forwarded into the printer PRT.

FIGS. 3(A) and 3(B) show the structure of the files of the sequential access type floppy disc drive system SDD and the RAM file memory 2, respectively.

FIG. 3(A) shows the structure of the file of the SDD. "d" designates a directory and "D" designates a data, both with a suffix for classification. The location of the directory "d" stores the file name, the attribute of the file, and the length of the data.

FIG. 3(B) shows the structure of the file of the RAM fiel memory 2. "S" indicates a sector with a suffix of the serial number of the sector. The location of sector "S0" stores a directory containing an address map of each of the files. The formats of FIGS. 3(A) and 3(B) are selected upon reading-out and writing-in.

With the arrangement of the files as shown in FIGS. 3(A) and 3(B), the files can be accessed as a random access memory.

FIG. 4 shows the structure of the file of the printer buffer memory 3.

The file of the printer buffer memory 3 contains a location of a pointer WP for indicating a position where to write-in the data in the buffer memory 3 and a location of the other pointer RP for indicating where to read-out the data from the printer buffer memory 3. The data are tentatively stored between the locations of the pointers WP and RP. Each time a data is written-in, the pointer WP is counted up. Each time a data is read-out, the pointer RP is counted up. No shift operation of the stored data is necessary.

The following operation is conducted to read-out and write-in the data using the printer buffer memory 3.

With reference to FIG. 1, a first line PI is provided on which a data of 8 bits is outputted from the printer interface circuit PRTI to the printer PRT. A second data line P2 is provided for transmitting a busy signal. A third data line P3 is provided for transmitting a ready signal. In response to the ready signal and an accept signal applied thereto, the printer interface circuit PRTI is hand-shaked with the printer PRT, so as to forward the code data. Further, in response to the busy signal, the printer interface circuit PRTI permits an interruption input in which in response to the decay of the busy signal, the printer interface circuit PRTI provides an interruption signal to the central processing unit CPU.

In the interruption operation, the CPU reads-out the code data from the printer buffer memory 3 and outputs them into the printer interface circuit PRTI. The read-out printer RP is renewed. The CPU writes-in the print out code into the printer buffer memory 3 and renews the write-in pointer WP. When the code data to be outputted into the printer buffer memory 3 becomes empty in whcih the pointers WP and RP are equal to each other, the CPU enables the printer interface circuit PRTI to be prohibited from the interruption. Even when the busy signal decays no interruption is conducted.

The following operation is conducted to write-in and read-out the data from the memory file CMF.

In FIG. 1, the contents of the memory file CMF are accessed through an input/output port as follows. Higher addresses A8–A15 of the memory file CMF are set in a register B in the central processing unit CPU. Lower addresses A0–A7 of the memory file CMF are treated as data D0–D7 to be outputted into an input-/output port of an input/output address of the address latch and counter AC by an indirect OUT instruction. Therefore, the data are latched in the counter AC. In FIG. 1, "C1" designates a lower address and "C2" designates an upper address. Each time the data are accessed, the value of the counter AC is automatically counted up. "C3" designates a chip selection and write-in signal. In response to the chip selection and write-in signal "C3", the contents of the counter AC are counted up. Thereafter, the write-in/read-out data are assumed to be the data D0–D7, so that the input/output address of the memory file CMF are accessed to enable the write-in and read-out operation. To read-out the data, the instruction of IN is used while to write-in the data, the instruction of OUT is used. It is sufficient for the CPU to select the start address, so that the CPU is not prevented from being overloaded. "C4" designates a column address and load address signal.

According to the present invention, the sequential access type flow disc drive system can provide the random access memory function. Due to the spool function, any waiting time during printing out the data can be eliminated from the memory.

While only certain embodiments of the present invention have been described, it will be apparent to those skilled in the art that various changes and modifications may be made therein without departing from the spirit and scope of the present invention as claimed.

What is claimed is:

1. A memory file system for a computer comprising:
   central processing unit (CPU) means for controlling the operation of the computer;
   external sequential access type memory means for storing data in a plurality of sequentially arrayed files, each file including a directory portion and a data portion, each said directory portion storing information identifying the data in the corresponding data portion;
   output means, controlled by said CPU means, for outputting said data;
   first random access memory (RAM) means for storing program instructions to be executed by said computer;
   second random access memory (RAM) means for storing all of the data in said plurality of files of said external memory means, said second RAM means including a directory section for storing respective addresses of the data stored in each file of said external memory means, and a buffer section for storing particular data to be outputted by said output means; and means for accessing the data stored in said sequential access type memory means by accessing said second RAM means.

2. The system of claim 1, wherein siad external memory means is a sequential access type floppy disc means.

3. The system of claim 1, further comprising:
write-in means for writing-in data in said buffer section of said RAM means, the written-in data being outputted from said RAM means to said CPU means;

interruption means for interrupting the operation of said CPU means in response to a signal indicating a non-operation condition of said output means; and second output means for outputting said written-in data into the first output means, said written-in data being outputted from said CPU means to said second output means according to the interruption operation.

4. The system of claim 1, wherein said output means comprising printer means.

* * * * *